US007258881B2

(12) United States Patent
Jones et al.

(10) Patent No.: US 7,258,881 B2
(45) Date of Patent: Aug. 21, 2007

(54) CONVEYORIZED OVEN WITH MOISTURE LADEN AIR IMPINGEMENT AND METHOD

(75) Inventors: Douglas S. Jones, New Port Richey, FL (US); Paul R Molloy, Clearwater, FL (US); William J. Day, Jr., New Port Richey, FL (US)

(73) Assignee: Enodis Corporation, New Port Richey, FL (US)

( * ) Notice: Subject to any disclaimer, the term of this patent is extended or adjusted under 35 U.S.C. 154(b) by 339 days.

(21) Appl. No.: 10/401,279

(22) Filed: Mar. 27, 2003

(65) Prior Publication Data

US 2003/0217645 A1 Nov. 27, 2003

Related U.S. Application Data

(60) Provisional application No. 60/383,978, filed on May 29, 2002, provisional application No. 60/368,024, filed on Mar. 27, 2002.

(51) Int. Cl.
*A21B 1/26* (2006.01)
(52) U.S. Cl. ............... 426/233; 426/510; 426/511; 426/523; 99/443 C; 99/476; 99/477
(58) Field of Classification Search ............ 426/233, 426/506, 509, 510, 511, 520, 523; 99/443 C, 99/467, 468, 473, 474, 476, 477
See application file for complete search history.

(56) References Cited

U.S. PATENT DOCUMENTS 3,736,860 A * 6/1973 Vischer, Jr. ............. 99/339

| 4,121,509 | A | * | 10/1978 | Baker et al. ............. 99/386 |
| 4,685,305 | A | * | 8/1987 | Burg ....................... 62/78 |
| 4,700,685 | A | * | 10/1987 | Miller ...................... 126/20 |
| 4,701,340 | A | * | 10/1987 | Bratton et al. ........... 426/511 |
| 4,873,107 | A | | 10/1989 | Archer ..................... 426/520 |
| 5,131,835 | A | * | 7/1992 | Rini et al. ................ 426/509 |
| 5,410,951 | A | * | 5/1995 | Ledet et al. .............. 99/443 C |
| 5,454,295 | A | * | 10/1995 | Cox et al. ................. 99/332 |
| 5,560,952 | A | * | 10/1996 | Miller et al. ............. 426/510 |

(Continued)

FOREIGN PATENT DOCUMENTS

EP   0 086 568   8/1983

(Continued)

OTHER PUBLICATIONS

Pizza Industry Facts. Pizzaware. 1997. http://web.archive.org/web/19980415104429/http://www.pizzaware.com/facts.htm.*

*Primary Examiner*—Drew Becker
(74) *Attorney, Agent, or Firm*—Ohlandt, Greeley, Ruggiero & Perle L.L.P.

(57) ABSTRACT

A conveyor oven having a heating chamber and an oven chamber. A conveyor is disposed in the oven chamber to convey food products between an entry port and an exit port. An air impingement assembly is disposed to provide jets of impingement air toward the food product. A fan blower, a heater and a moisture delivery device are arranged to provide heat and moisture to an airflow to the air impingement assembly so that the jets of air are heated and laden with moisture and provide as a blanket-like mixture of air and moisture at the surface of the food product.

19 Claims, 6 Drawing Sheets

U.S. PATENT DOCUMENTS

| | | | |
|---|---|---|---|
| 5,619,983 A * | 4/1997 | Smith | 126/348 |
| 5,654,021 A * | 8/1997 | Burger | 426/94 |
| 5,741,536 A * | 4/1998 | Mauer et al. | 426/520 |
| 5,752,662 A * | 5/1998 | Hsu | 239/289 |
| 5,786,566 A * | 7/1998 | Miller et al. | 219/400 |
| 5,832,812 A * | 11/1998 | Wolfe et al. | 99/443 C |
| 5,934,178 A * | 8/1999 | Caridis et al. | 99/330 |
| 6,023,050 A * | 2/2000 | Violi | 219/401 |
| 6,146,678 A | 11/2000 | Caridis et al. | 426/510 |
| 6,188,045 B1 * | 2/2001 | Hansen et al. | 219/401 |
| 6,365,210 B1 * | 4/2002 | Schaible et al. | 426/94 |
| 6,572,911 B1 * | 6/2003 | Corcoran et al. | 426/510 |
| 6,595,117 B1 * | 7/2003 | Jones et al. | 99/386 |
| 6,629,493 B1 * | 10/2003 | Schaible, II et al. | 99/352 |
| 6,817,283 B2 * | 11/2004 | Jones et al. | 99/386 |

FOREIGN PATENT DOCUMENTS

| | | |
|---|---|---|
| EP | 0 859 199 | 8/1998 |
| WO | WO89/00393 | 1/1989 |

* cited by examiner

CONVEYORIZED OVEN WITH MOISTURE LADEN AIR IMPINGEMENT AND METHOD

This application claims the benefit of U.S. Provisional application 60/368,024, filed on Mar. 27, 2002 and U.S. Provisional application 60/383,978, filed on May 29, 2002, the entire contents of each being incorporated herein by reference.

FIELD OF THE INVENTION

This invention relates to a conveyor oven and method of operating a conveyor oven. In particular, the invention relates to a conveyor oven and method that cooks food products by heated impingement air.

BACKGROUND OF THE INVENTION

Conveyor ovens that use impingement air are known for the cooking of various products, including bakery products, pizza and various other food products. Typical conveyor ovens using impingement air are described in U.S. Pat. Nos. 4,701,340, 4,873,107 and 5,832,812. U.S. Pat. No. 4,701,340 discloses a conveyor oven that includes three cooking zones serially arranged along the conveyor path. The two end zones apply jets of heated impingement air to food products carried on the conveyor. The middle zone applies jets of steam to the food products. The middle zone requires a separate steam delivery system that is entirely independent of the air impingement assemblies for the end zones. The separate steam delivery system requires a steam generator and a large number of steam delivery tubes. The separate steam system adds cost to the conveyor oven.

There is a need for an economic conveyor oven that cooks food products with both moisture and heated impingement air.

SUMMARY OF THE INVENTION

A conveyor oven according to the present invention comprises a conveyor that conveys a food product between an entry port and an exit port. An air impingement assembly is disposed between the entry port and the exit port and arranged to provide jets of air toward the food product. A fan blower, a heater and a moisture delivery device are disposed to provide a heated and moisture laden airflow to the air impingement assembly so that the jets of air are heated and laden with moisture.

In a first embodiment, the moisture is delivered to a suction side of the fan blower. The fan blower includes a plurality of blades arranged about its periphery. The moisture is preferably injected radially inward onto the fan blades.

In a second embodiment, the moisture is delivered to an output side of the fan blades. The moisture is preferably provided to contact the fan blades.

In either the first or second embodiment, the moisture delivery device includes means to vary the amount of the moisture delivered to the airflow. Preferably, the heater is also controllable to vary the heat applied to the airflow.

Also, in either the first or second embodiment, a mixture of air and moisture is preferably produced at the surface of the food product.

Further in either of the first and second embodiments, the mixture is preferably a blanket-like mixture of air and moisture that is produced by the jets of air and moisture having an airflow pattern that coalesces at the food product surface. Alternatively, the mixture is in the form of columns of moisture laden air.

The conveyor oven of the present invention further comprises an oven chamber and a heating chamber. The fan blower is disposed in the heating chamber to circulate the airflow between the heating chamber and the oven chamber via the air impingement assembly.

Preferably, the air impingement assembly comprises one or more jet fingers disposed above and/or below the conveyor. In some embodiments of the present invention the impingement fingers are disposed in a plurality of cooking zones along the conveyor. Preferably, the heat and moisture of the different zones can be separately controlled.

In other embodiments, the conveyor comprises a plurality of conveyors disposed in a stacked relationship. The air impingement assembly provides the jets of heated and moisture laden impingement air to food products carried by each of the conveyors.

The method of the present invention conveys a food product with a conveyor. An airflow is converted to jets of impingement air that are provided toward the food product. The airflow is heated and provided with moisture so that the jets of impingement air are heated and laden with moisture.

Preferably, a mixture of air and moisture is produced at the surface of the food product.

The mixture is preferably a blanket-like mixture of air and moisture that is produced by the jets of air and moisture having an airflow pattern that coalesces at the food product surface. Alternatively, the mixture is in the form of columns of moisture laden air.

Preferably, the amount of moisture provided to the airflow and/or the heat applied to the airflow is controllable.

In the conveyor oven and method embodiments, the moisture is preferably water, but, alternatively, may be steam.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
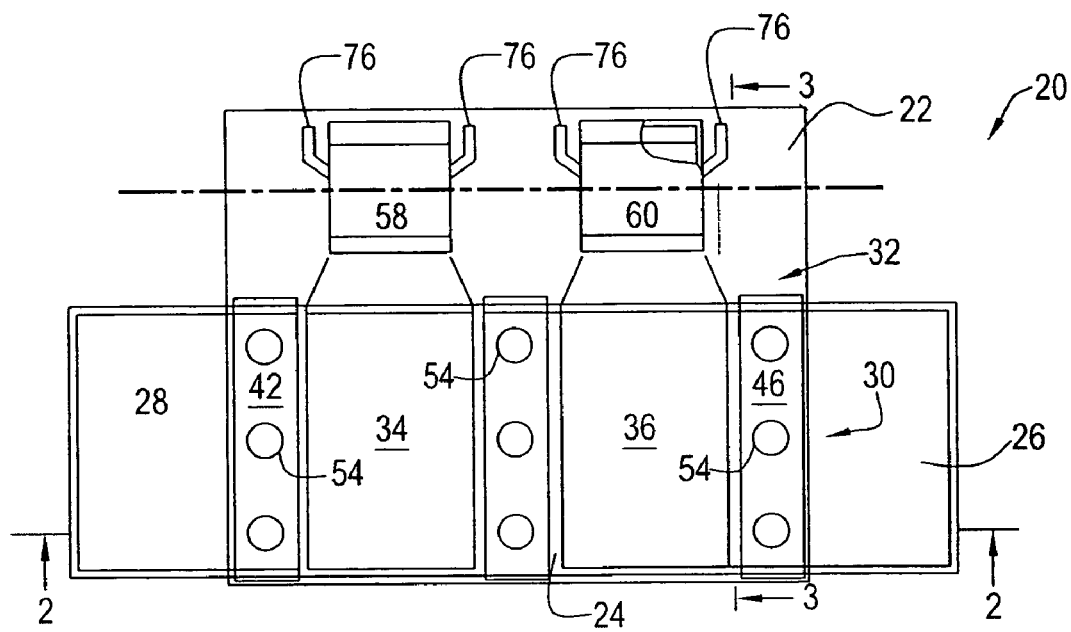
FIG. 1 is a top view of the conveyor oven with top cover removed of the present invention.
Figure 2:
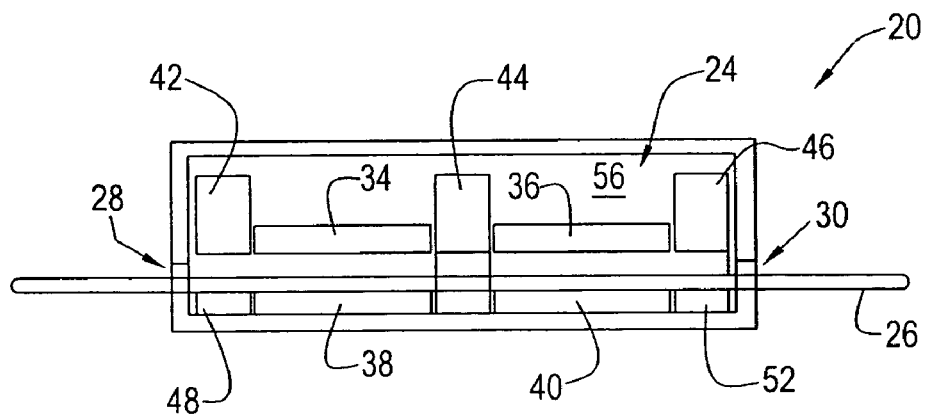
FIG. 2 is a view taken along line 2 of FIG. 1.
Figure 3:
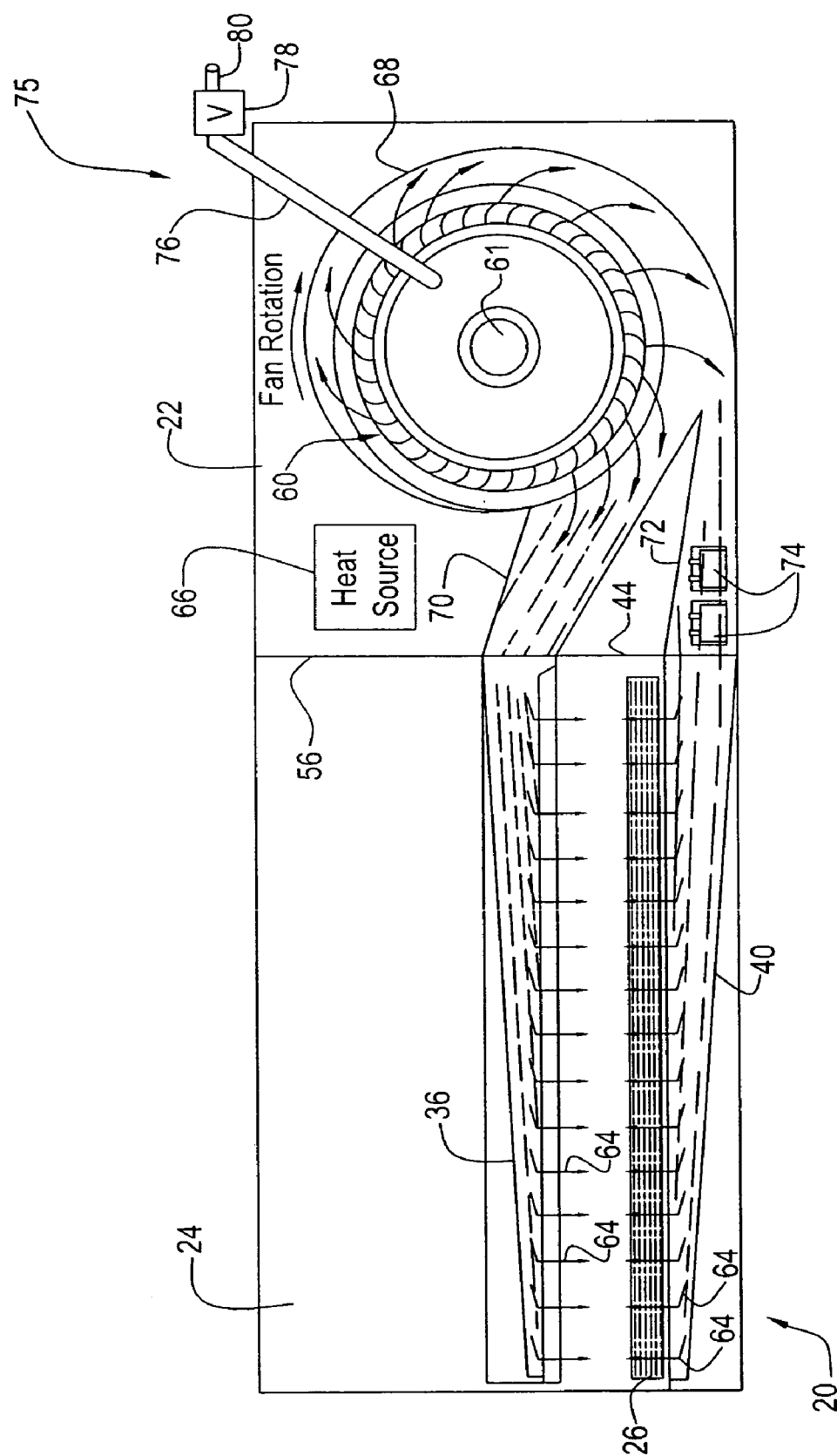
FIG. 3 is a view taken along line 3 of FIG. 1.

Referring to FIGS. 1-3, a conveyor oven 20 of the present invention includes a heating chamber 22, an oven chamber 24 and a conveyor 26. Conveyor 26 is disposed to convey food products, such as pizza, through oven chamber 24 by entering an entry port 28 and exiting an exit port 30 of oven chamber 24. That is, conveyor 26 carries food products in the direction of left to right in FIGS. 1 and 2. Conveyor 26 may be moved or rotated by any suitable conveyor motion assembly (not shown), known presently or in the future. It will be apparent to those skilled in the art that the conveyor direction can be reversed simply by changing the direction of rotation of a drive motor of the conveyor motion assembly.

An impingement air duct assembly 32 includes an upper impingement finger 34, an upper impingement finger 36, a lower impingement finger 38, a lower impingement finger 40 and return ducts 42, 46, 48 and 52. Upper impingement finger 34 is disposed in oven chamber 24 above conveyor 26 and lower impingement finger 38 is disposed in oven chamber 24 below conveyor 26 and directly below upper impingement finger 34. Upper impingement finger 36 is disposed in oven chamber 24 above conveyor 26 and lower impingement finger 40 is disposed in oven chamber 24 below conveyor 26 and directly below upper impingement finger 36.

Upper impingement fingers 34 and 36 and lower impingement fingers 38 and 40 each include a plurality of jet openings that are shaped to provide jets of impingement air toward conveyor 26 so as to impinge on food products carried thereon. For example, upper impingement finger 36 and lower impingement finger 40 include jet openings 64 that are distributed over their respective surfaces that face conveyor 26 so as to provide a uniform distribution of impingement air to the food products on conveyor 26.

It will be apparent to those skilled in the art that impingement air duct assembly can have more or less than the four air jet fingers shown in FIGS. 1-3. For example, the air duct assembly could have a single upper and a single lower jet finger disposed opposite one another.

Conveyor 26 includes openings (not shown) which permit airflow from lower impingement fingers 38 and 40 to penetrate and impinge food products carried thereon. For example, conveyor 26 may include a pair of endless chains between which are disposed are plurality of strips or rods, upon which the food products are situated for travel through oven chamber 24.

Return ducts 42 and 46 are disposed in oven chamber 24 above conveyor 26 and return ducts 48 and 52 are disposed in oven chamber 24 below conveyor 26 and directly below ducts 42 and 46, respectively. Return ducts 42 and 48 are disposed in oven chamber 24 between upper and lower impingement fingers 34 and 38 and entry port 28. Return ducts 46 and 52 are disposed in oven chamber 24 between upper and lower impingement fingers 36 and 40 and exit port 30. Return ducts 42, 46, 48 and 52 each include one or more openings 54 through which return air enters from oven chamber 24.

An oven wall 56 separates oven chamber 24 from heating chamber 22. Upper impingement fingers 34 and 36 and lower impingement fingers 38 and 40 extend through openings (not shown) in oven wall 56 into heating chamber 22. Return ducts 42, 44, 46, 48, 50 and 52 mate with openings in oven wall 56 so as to be in fluid communication with heating chamber 22. Oven wall 56 includes an opening 44 disposed between impingement fingers 34 and 38 and impingement fingers 36 and 40. Opening 44 extends above and below conveyor 26. Alternatively, upper and lower air return ducts can be provided in fluid communication with opening 44 to better balance the return airflow.

A fan blower 58 is disposed in heating chamber 22 and provides heated air to oven chamber 24 via upper and lower impingement fingers 34 and 38. A fan blower 60 is disposed in heating chamber 22 and provides a heated airflow to oven chamber 24 via upper and lower impingement fingers 36 and 40.

Impingement air duct assembly 32 includes duct extensions that extend into heating chamber 22 to provide duct paths between fan blower 58 and upper and lower impingement fingers 34 and 38 and between fan blower 60 and upper and lower impingement fingers 36 and 40. For example, with reference to FIG. 3, a shroud 68 surrounds the periphery of fan blower 60 and connects with upper and lower impingement fingers 36 and 40 via a pair of upper and lower duct sections 70 and 72, respectively. A similar shroud and upper and lower duct sections (not shown) are provided for fan blower 58.

Fan blowers 58 and 60 are operable to circulate air between heating chamber 22 and oven chamber 24 via impingement air duct assembly 32 and opening 44. For example, with reference to FIGS. 2 and 3, fan blower 60 provides a circulating airflow via shroud 68, upper and lower duct sections 70 and 72, upper and lower impingement fingers 36 and 40, upper and lower return ducts 46 and 52 and opening 44. Fan blowers 58 and 60 preferably have backward inclined blades and are driven by a motors (not shown). For example, with reference to FIG. 3, fan blower 60 has a shaft 61 that is coupled to a drive motor and a plurality of backward inclined blades about its periphery.

A suitable heat source 66 is disposed at a desired location in heating chamber 22 to heat the circulating air. Heat source 66 may be an electrical heater or a gas burner as desired. Heat source 66 may be disposed to the suction input side of fan blowers 58 and 60 or at the output side thereof. Alternatively, separate heat sources may be provided for each fan blower so that the zone or area between upper and lower impingement fingers 34 and 38 can be temperature controlled independently of the zone or area between upper and lower impingement fingers 36 and 40.

The temperature of the impingement air delivered to the bottom and top of the food product can be controlled to be the same or different. For example, with reference to FIG. 3, one or more electric heaters 74 are disposed in lower duct section 72 to supply a boost in heat to the impingement air provided by lower impingement finger 40 to the bottom of the food products. Preferably, heat source 66 is capable of being controlled to vary the heat applied to the airflow.

In accordance with the invention, moisture is imparted into the circulating airflow so that the jets of air delivered to the food products by the impingement air duct assembly are not only heated but also laden with moisture. Referring to FIGS. 1 and 3, moisture is introduced in the circulating heated airflow in the interior of fan blowers 58 and 60 so that the heated impingement air, as delivered to oven chamber 24, is laden with moisture. The moisture laden air enhances the thermal transfer rate by about 300% vis-à-vis the thermal transfer rate of dry air.

A moisture delivery device 75 includes a plurality of delivery tubes 76 that are disposed at the low pressure sides of fan blowers 58 and 60. As shown in FIG. 3, moisture delivery device 75 includes a valve 78 that connects the tubes 76 to a water line 80. Valve 78 may be controlled to modulate the humidity provided by the jets of impingement air of each pair of an upper jet finger and a lower jet finger. Moisture delivery device 75 may include a separate valve 78 for each zone so as to separately control the moisture content of the jet impingement air in each zone.

Those skilled in the art will appreciate that conveyor oven 20 includes a support structure for holding in place conveyor 26, impingement air duct assembly 32, fan blowers 58 and 60 and moisture delivery tubes 76. The support structure may be any suitable support structure, known presently or in the future.

Figure 4:
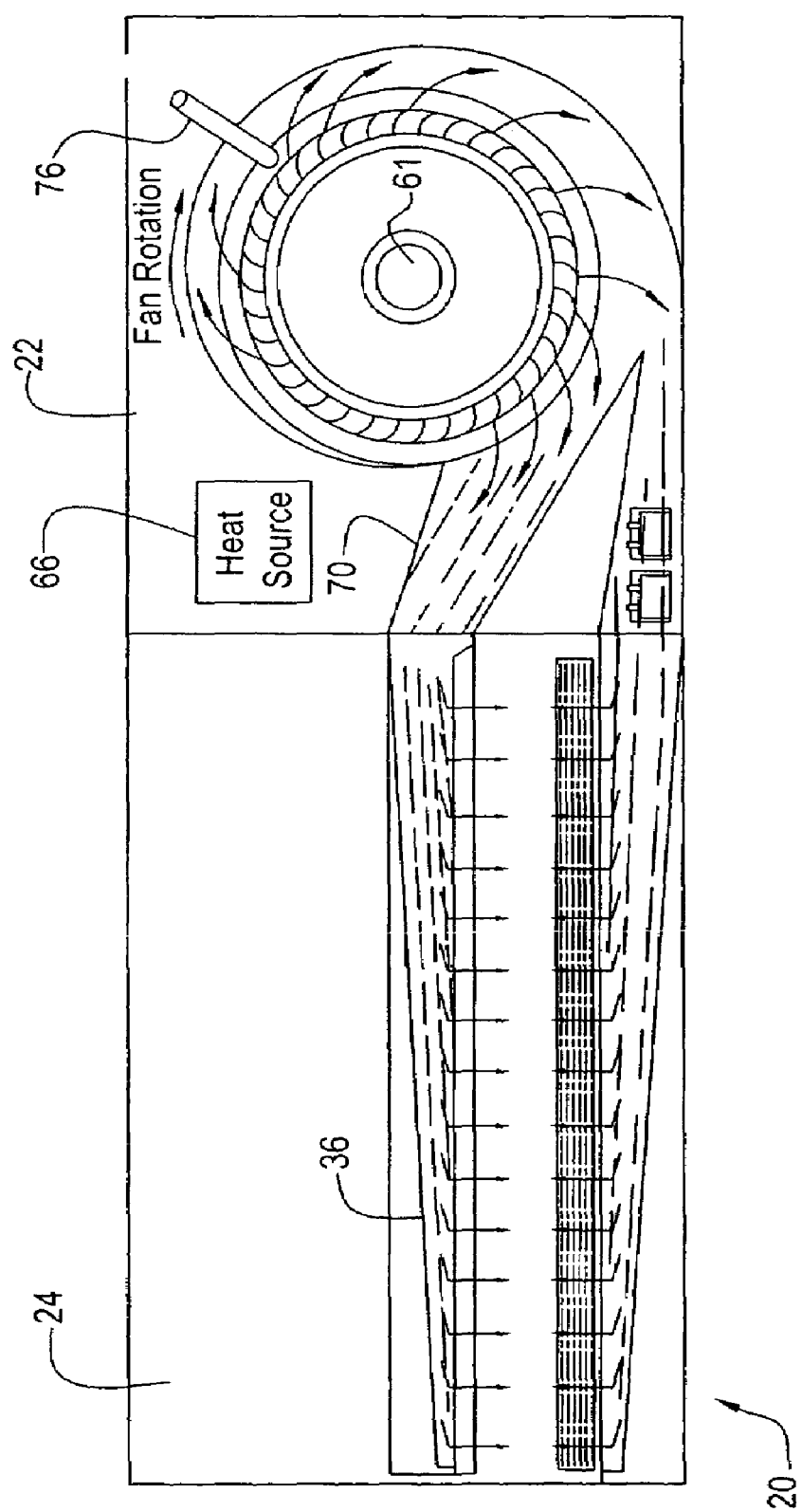
FIG. 4 depicts an alternate location for the delivery tube of the FIG. 1 conveyor oven.

Referring to FIG. 4, delivery tube 76 is alternatively located to introduce water to the heated air stream at the external blades of the fan blower 58 or 60.

Alternatively, steam provided by a steam generator (not shown) may be introduced in the circulating heated airflow via delivery tubes 76. In either case, the water or the steam is introduced in a regulated manner into the intake or the blades of fan blowers 58 or 60 so as to impart moisture to the radially exiting air on the high pressure side of the fan. When water is used, the contact of water with the hot surface of the fan wheel or blades, causes a rapid evaporation from water to vapor.

Figure 5:
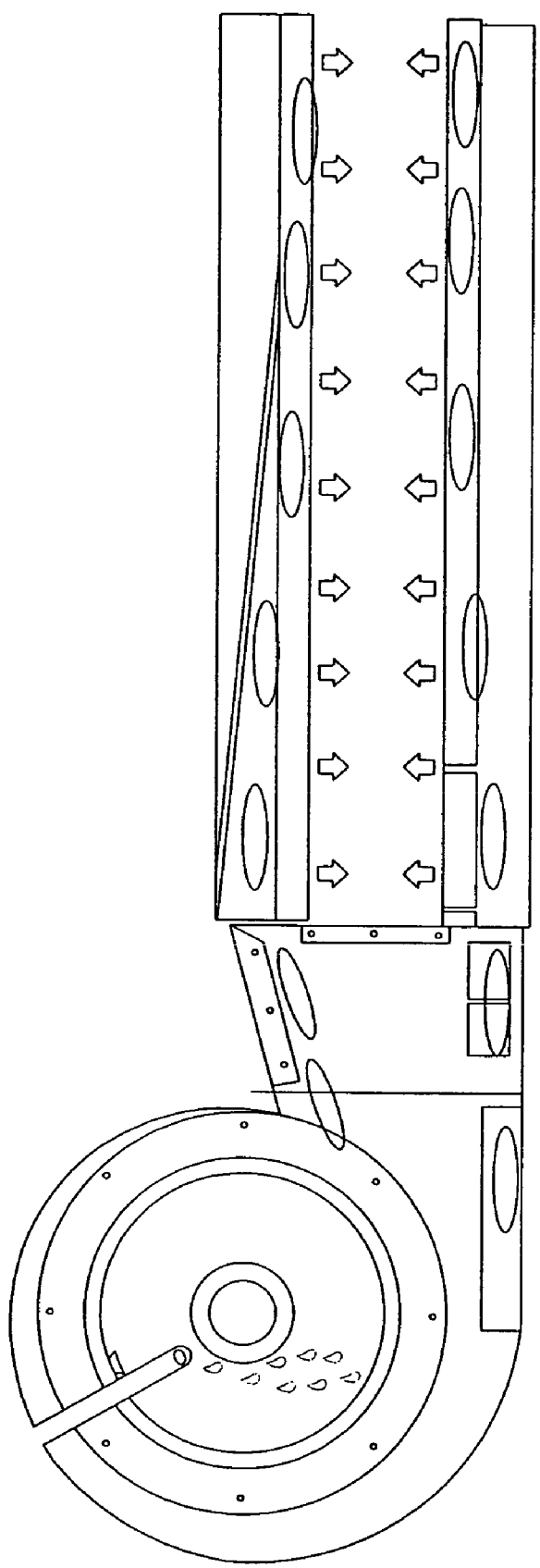
FIG. 5 is a view depicting the conveyor oven of FIG. 1 with moisture laden air.

Referring to FIG. 5, the heated and moisture laden airflow is shown circulating through impingement air duct assembly 32 and being delivered as jets of heated and moisture laden air.

In the conveyor oven of the present invention, cooking begins almost immediately in the moisture laden heated air. A cooking pan (not shown) for the food product heats faster in moisture laden air than in dry air due to greater thermal transfer from the moisture. For example, a cheese topping for a pizza or other food product begins melting almost immediately. By introducing the moisture in the heated airflow at a point that provides impingement air columns or jets laden with moisture, a mixture of moisture laden air is provided at the surface of the food product, thereby providing homogeneous cooking. The mixture may be in the form of columns of moisture laden air that impact the surface of the food product.

Also, the jet apertures can be shaped and positioned to provide an airflow pattern of overlapping jets that coalesce, diffuse or plume to form a blanket-like mixture of heated and moisture laden air at the food surface of the food product, as, for example, described in copending U.S. application, Ser. No. 10/167,335, filed on Jun. 11, 2002, for High Speed Cooking device and Method and assigned to the assignee of the present application, which is incorporated herein by reference. For example, the jet apertures can have a jet cross-section of a dog bone, jack, starburst or other shape that achieves the blanket-like effect at the surface of the food product. The blanket of air provided by these types of jet cross-sections allows the delivery rate of the heated and moisture laden air to be tuned in a range that permits food products of different heights to be cooked without burning by merely adjusting fan speed.

Conventional conveyor ovens that introduced steam via tubes arranged between the air impingement columns have failed to provide a homogeneous mixture of moisture laden air.

In the conveyor oven of the present invention, caramelizing of food is more forgiving. Normally, caramelizing (i.e., browning) does not occur in a steam cabinet. However, the homogeneous mixture in a humidified environment created by the conveyor oven of the present invention provides rapid cooking times as well as caramelizing.

Figure 6:
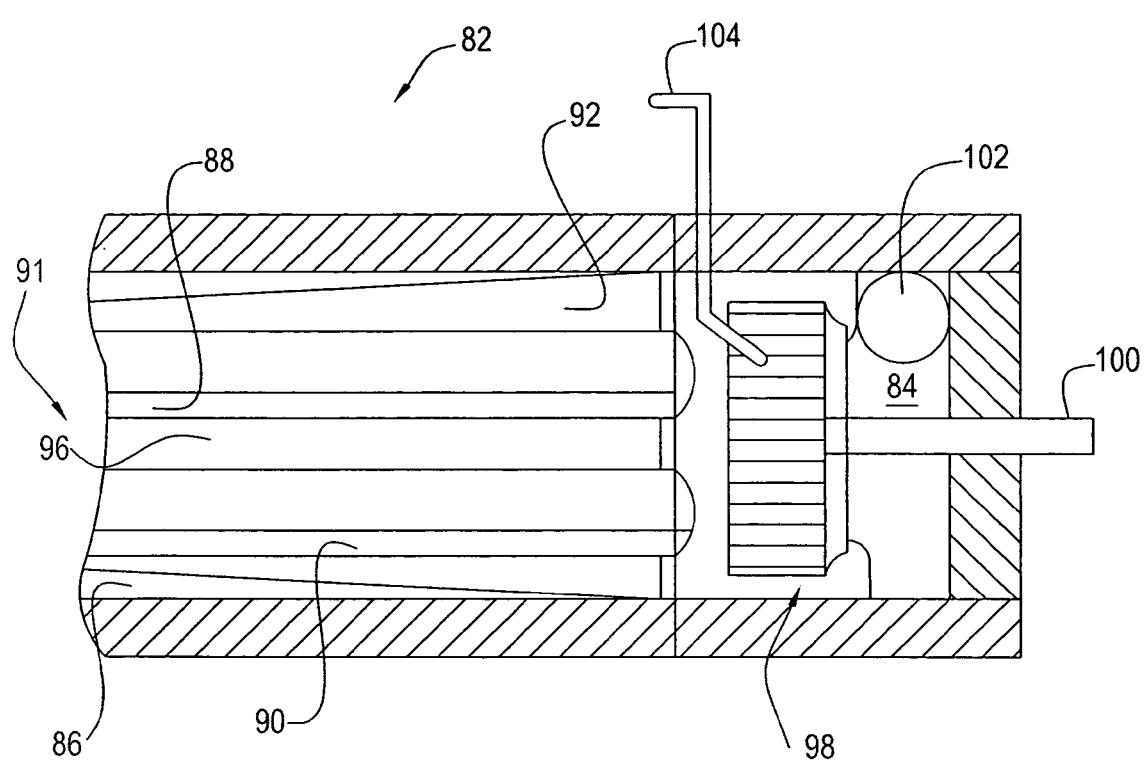
FIG. 6 is a cross-sectional view of another embodiment of the conveyor oven of the present invention.
Figure 7:
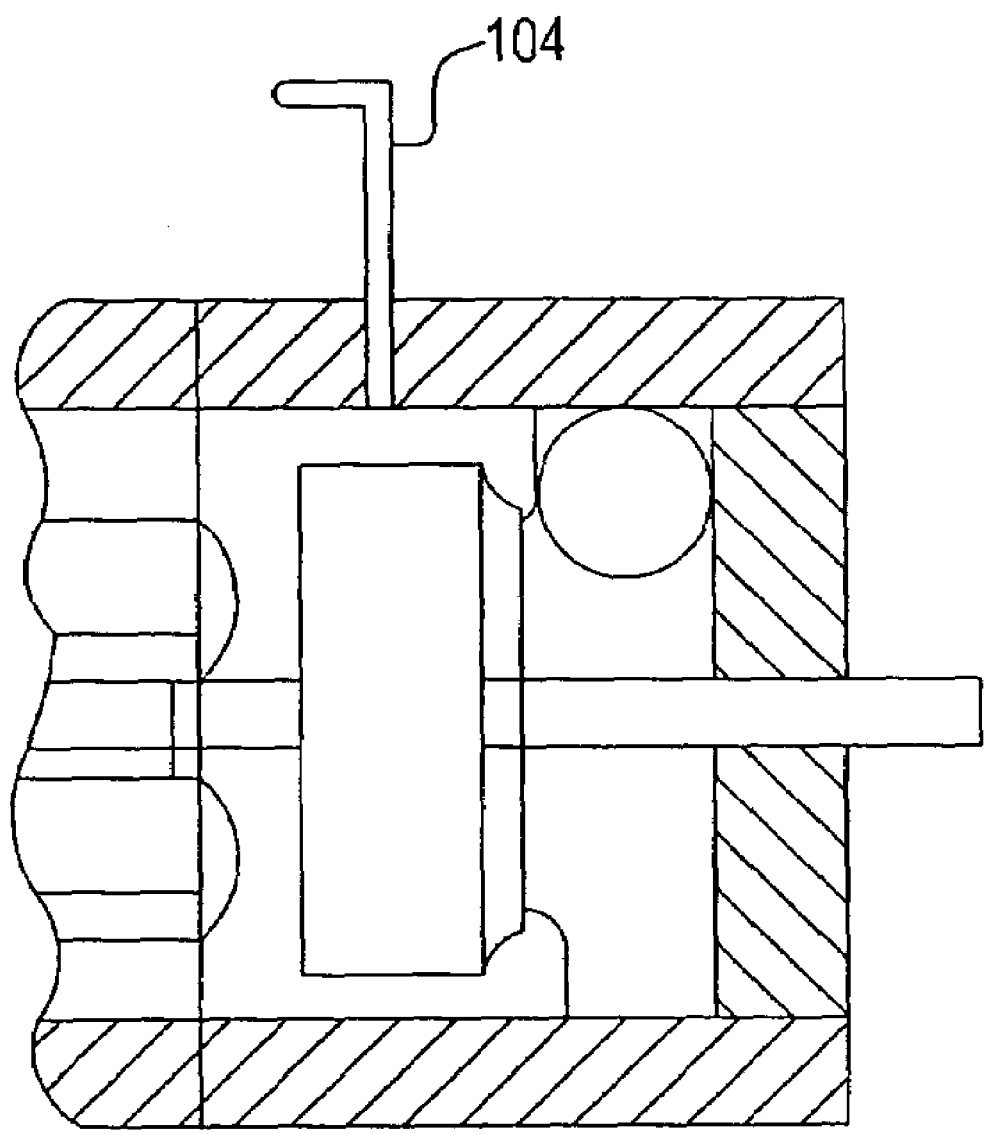
FIG. 7 is a cross-sectional view of the conveyor oven of FIG. 6 depicting an alternate location of the delivery tube.

Referring to FIGS. 6 and 7, an alternate conveyor oven 82 of the present invention comprises a heating chamber 84 and an oven chamber 86. An upper conveyor 88 and a lower conveyor 90 are disposed in oven chamber 86 in a stacked relationship. Upper and lower conveyors 88 and 90 are operable to convey food products through oven chamber 86 in a direction perpendicular to the plane of the drawing sheet.

An impingement air duct assembly 91 includes an upper jet finger 92, a lower jet finger 94 and a middle jet finger 96. Upper jet finger 92 is disposed above upper conveyor 88 to provide jets of impingement air to the top of a food product disposed thereon. Lower jet finger 94 is disposed beneath lower conveyor 90 to provide jets of impingement air to the bottom of a food product disposed thereon. Middle jet finger 96 is disposed between upper conveyor 88 and lower conveyor 90 to provide jets of impingement air to the bottom of the food product on upper conveyor 88 and to the top of the food product disposed on lower conveyor 90.

A centrifugal fan blower 98 having backward inclined blades is disposed in heating chamber 84. Fan blower 98 has a shaft 100 that is perpendicular to the motion of upper and lower conveyors 88 and 90 in a manner that its high and low pressure sides face toward and away from oven chamber 86, respectively. It will be appreciated by those skilled in the art that two or more fan blowers may be provided. Fan blower 98 provides a heated airflow for circulation from heating chamber 84, upper, middle and lower jet fingers 92, 94 and 96 to oven chamber 86 and back to heating chamber 84 via a fluid communication, e.g., return ducts (not shown) of air impingement assembly 91. A burner tube 102 heats the circulating airflow. Moisture is introduced into the heated airflow via a delivery tube 104. The moisture is delivered to the interior of the fan in the embodiment of FIG. 6 and to the exterior of the fan blades in the embodiment of FIG. 7. In either case, a source of water or a source of steam may provide the moisture in a regulated manner, e.g., via a valve as shown in FIG. 3 for conveyor oven 20.

The present invention having been thus described with particular reference to the preferred forms thereof, it will be obvious that various changes and modifications may be made therein without departing from the spirit and scope of the present invention as defined in the appended claims.

What is claimed is:

1. A conveyor oven comprising:
   a conveyor that conveys a food product through an oven chamber between an entry port and an exit port;
   a fan blower that provides a heated airflow, a heater that heats said airflow, and a moisture delivery device that is positioned to bring water into contact with a heated surface of said fan blower to effect a rapid evaporation from water to vapor in a heating chamber to provide a heated and moisture laden airflow; and
   an air impingement assembly disposed between said entry port and said exit port to receive and convert said heated and moisture laden airflow to jets of heated and moisture laden impingement air toward said food product in said oven chamber, thereby producing a mixture of air and moisture at the surface of the food product.

2. The conveyor of claim 1, wherein said jets of air and moisture impact said surface of said food product with an airflow pattern that coalesces at the food product surface, and wherein said mixture is a blanket-like mixture of air and moisture.

3. The conveyor oven of claim 1, wherein said jets of heated and moisture laden impingement air are provided at a surface of said food product, thereby providing homogeneous cooking of said food product.

4. The conveyor oven of claim 1 wherein said fan blower comprises a periphery and a plurality of blades arranged about said periphery, and wherein said water is injected radially inward onto said fan blades.

5. The conveyor oven of claim 1, wherein said moisture delivery device provides water to either a suction side of said fan blower or an output side of said fan blower.

6. The conveyor oven of claim 5, wherein said fan blower comprises a periphery and a plurality of fan blades arranged about said periphery, and wherein said water is provided to contact said fan blades.

7. The conveyor oven of claim 1, wherein said moisture wherein said moisture delivery device includes means to vary the amount of said water delivered to said airflow.

8. The conveyor oven of claim 1, wherein said heater and/or said delivery device are capable of being controlled to vary the temperature and/or humidity of said moisture laden airflow.

9. The conveyor oven of claim 1, wherein said air impingement assembly comprises one or more jet fingers disposed above and/or below said conveyor.

10. The conveyor oven of claim 9, wherein said impingement fingers are disposed in one or more cooking zones along said conveyor.

11. The conveyor oven of claim 10, wherein the heat and moisture provided to the impingement fingers in said one or more cooking zones is separately controllable.

12. The conveyor oven of claim 1, wherein said conveyor comprises a plurality of conveyors disposed in a stacked relationship, and wherein said air impingement assembly provides said jets of heated and moisture laden impingement air to food products carried by each of said conveyors.

13. The conveyor oven of claim 1, wherein said surface is a blade or a wheel of said fan blower.

14. A method of operating a conveyor oven that comprises an oven chamber and a heating chamber comprising:
conveying a food product with a conveyor through said oven chamber;
providing with a fan blower an airflow that circulates between said oven chamber and said heating chamber;
heating said airflow and a surface of said fan blower;
bringing water into contact with said heated surface of said fan blower to effect a rapid evaporation from water to vapor in said airflow in said heating chamber, thereby providing a heated and moisture laden airflow; and
receiving and converting said heated and moisture laden airflow in an air impingement assembly to jets of heated and moisture laden impingement air that are provided toward said food product in said oven chamber.

15. The method of claim 14, wherein said jets of heated and moisture laden impingement air impact said surface of said food product with an air pattern that coalesces at the food product surface as a blanket-like mixture of air and moisture.

16. The method of claim 14, further comprising a step of controlling an amount of said water provided to said airflow.

17. The method of claim 15, wherein said impingement assembly includes a plurality of jet apertures that are shaped and positioned so that said jets of air overlap to provide said blanket-like mixture.

18. The method of claim 17, wherein one or more of said jet apertures have a cross-section selected from the group consisting of dog bone, jack and starburst.

19. The method of claim 14, wherein said heated surface is a blade or a wheel of said fan.

* * * * *